(12) United States Patent
Chuang et al.

(10) Patent No.: US 11,429,144 B2
(45) Date of Patent: Aug. 30, 2022

(54) ACCESSORY HOLDERS

(71) Applicant: Hewlett-Packard Development Company, L.P., Spring, TX (US)

(72) Inventors: Po-Feng Chuang, Taipei (TW); Kun-Hung Lin, Taipei (TW); Shih-hua Chang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/058,693

(22) PCT Filed: Dec. 21, 2018

(86) PCT No.: PCT/US2018/067008
§ 371 (c)(1),
(2) Date: Nov. 25, 2020

(87) PCT Pub. No.: WO2020/131093
PCT Pub. Date: Jun. 25, 2020

(65) Prior Publication Data
US 2021/0365065 A1   Nov. 25, 2021

(51) Int. Cl.
*G06F 1/16* (2006.01)
(52) U.S. Cl.
CPC .... *G06F 1/1607* (2013.01); *G06F 2200/1632* (2013.01)
(58) Field of Classification Search
CPC ............. G06F 1/1656; G06F 1/1684; G06F 2200/1632; H04M 1/0285
See application file for complete search history.

(56) References Cited

U.S. PATENT DOCUMENTS

| | | | | |
|---|---|---|---|---|
| 6,536,621 B2* | 3/2003 | Yokobori | ............... | A45C 13/26 220/4.02 |
| 7,287,738 B2* | 10/2007 | Pitlor | .................. | H02G 3/20 248/205.4 |
| 7,623,121 B2* | 11/2009 | Dodge | ............... | G06F 3/0393 345/179 |
| 7,661,567 B2* | 2/2010 | Myers | .................. | A45C 13/20 224/217 |
| 7,852,621 B2* | 12/2010 | Lin | ............... | G06F 1/1698 361/679.02 |
| 7,929,297 B2* | 4/2011 | Chen | ............... | H04M 1/026 361/679.56 |
| 8,374,657 B2* | 2/2013 | Interdonato | ............ | H04B 1/385 455/575.4 |

(Continued)

FOREIGN PATENT DOCUMENTS

| | | |
|---|---|---|
| CN | 201876768 U | 6/2011 |
| JP | 2016157380 A | 9/2016 |

(Continued)

*Primary Examiner* — Adrian S Wilson
(74) *Attorney, Agent, or Firm* — HP Inc. Patent Department (57) ABSTRACT

In an example, an accessory holder may include an expandable loop movable between a stowed position within a housing of a device chassis and a deployed position. When in the deployed position, the expandable loop may extend out of the housing to receive and hold a device accessory. The example accessory holder may further include a bias member to urge the expandable loop towards the stowed position.

13 Claims, 8 Drawing Sheets

(56) References Cited

U.S. PATENT DOCUMENTS

| | | | |
|---|---|---|---|
| 8,515,501 B2 * | 8/2013 | Lee | G06F 1/1626 |
| | | | 455/575.1 |
| 8,550,317 B2 * | 10/2013 | Hyseni | A45F 5/00 |
| | | | 224/197 |
| 8,902,574 B2 * | 12/2014 | Su | G06F 1/1656 |
| | | | 361/679.12 |
| 8,950,638 B2 * | 2/2015 | Wangercyn, Jr. | A45F 5/00 |
| | | | 224/217 |
| 9,016,534 B2 * | 4/2015 | Whitley | A45F 5/00 |
| | | | 224/257 |
| 9,063,693 B2 * | 6/2015 | Raken | G06F 1/1656 |
| 9,155,377 B2 * | 10/2015 | Wangercyn, Jr. | H04B 1/385 |
| 9,268,379 B2 | 2/2016 | Ashcraft et al. | |
| 9,395,753 B2 * | 7/2016 | Amano | B65D 25/005 |
| 9,408,446 B2 * | 8/2016 | Liebers | A45C 11/04 |
| 9,575,579 B2 * | 2/2017 | Ashcraft | H02J 50/10 |
| 9,748,999 B2 | 8/2017 | Nyholm et al. | |
| D796,515 S | 9/2017 | Kim et al. | |
| 9,762,278 B2 * | 9/2017 | Griffin, II | G06F 1/1626 |
| 9,778,700 B2 | 10/2017 | Zaloom | |
| 10,213,010 B2 * | 2/2019 | Pearce | B25G 1/102 |
| 10,243,609 B2 * | 3/2019 | Griffin, II | H04B 1/3888 |
| 10,411,748 B1 * | 9/2019 | Lucente | G06F 3/03545 |
| 10,455,927 B2 * | 10/2019 | Brousseau | B25G 1/02 |
| 10,574,284 B1 * | 2/2020 | Winston | H04M 1/0202 |
| 10,649,548 B2 * | 5/2020 | Pirie | G06F 1/1643 |
| 10,693,517 B2 * | 6/2020 | Osmanski | A45C 11/00 |
| 2006/0138182 A1 * | 6/2006 | Carlsson | A45F 5/10 |
| | | | 224/257 |
| 2007/0236467 A1 * | 10/2007 | Marshall | G06F 3/041 |
| | | | 345/173 |
| 2008/0186683 A1 * | 8/2008 | Ligtenberg | G06F 1/1679 |
| | | | 361/726 |
| 2009/0268386 A1 * | 10/2009 | Lin | G06F 1/1656 |
| | | | 361/679.02 |
| 2010/0092234 A1 * | 4/2010 | Zhang | A45F 5/00 |
| | | | 403/23 |
| 2010/0304797 A1 * | 12/2010 | Yang | H04M 1/15 |
| | | | 455/575.1 |
| 2011/0136555 A1 | 6/2011 | Ramies et al. | |
| 2011/0163642 A1 | 7/2011 | Rohrbach et al. | |
| 2011/0266316 A1 * | 11/2011 | Ghalib | A45F 5/00 |
| | | | 224/217 |
| 2011/0309117 A1 * | 12/2011 | Roberts | H04M 1/04 |
| | | | 224/217 |
| 2012/0048873 A1 * | 3/2012 | Hyseni | A45F 5/00 |
| | | | 220/752 |
| 2012/0167349 A1 * | 7/2012 | Smith | B65H 75/4428 |
| | | | 24/3.4 |
| 2013/0021729 A1 * | 1/2013 | Su | G06F 1/1656 |
| | | | 361/679.01 |
| 2013/0049345 A1 * | 2/2013 | Imbernino | B42D 3/12 |
| | | | 281/31 |
| 2013/0119099 A1 * | 5/2013 | Interdonato | A45F 5/00 |
| | | | 224/217 |
| 2013/0146625 A1 * | 6/2013 | Karie | A45F 5/00 |
| | | | 224/217 |
| 2014/0262847 A1 * | 9/2014 | Yang | F16M 11/14 |
| | | | 206/37 |
| 2015/0116286 A1 | 4/2015 | Stewart et al. | |
| 2015/0289634 A1 * | 10/2015 | Chavez | H04B 1/3888 |
| | | | 224/162 |
| 2017/0063419 A1 * | 3/2017 | Griffin, II | A45C 11/00 |
| 2017/0338845 A1 * | 11/2017 | Griffin, II | G06F 1/1626 |
| 2018/0070705 A1 * | 3/2018 | Jose | B65H 75/4434 |
| 2018/0338845 A1 | 11/2018 | Mangiardi | |
| 2019/0116247 A1 * | 4/2019 | Giles | B65H 75/4421 |
| 2019/0181905 A1 * | 6/2019 | Griffin, II | G06F 1/1626 |
| 2020/0201396 A1 * | 6/2020 | Meng | G06F 1/1626 |

FOREIGN PATENT DOCUMENTS

| | | |
|---|---|---|
| TW | M550074 | 10/2017 |
| WO | WO-2018017118 A1 | 1/2018 |

* cited by examiner

ACCESSORY HOLDERS

BACKGROUND

Electronic devices such as computing devices may be utilized in various ways. In some situations, electronic devices may be interacted with by a user through various types of interfaces, for example, mice, trackpads, keyboards, etc. In some situations, electronic devices may include a display, which may be a touch screen display. A user may interact with a touch screen display by touching by hand, or by using an accessory, such as a stylus or electronic pen.

DETAILED DESCRIPTION

Electronic devices such as computing devices may be utilized in various ways. In some situations, electronic devices may be interacted with by a user through various types of interfaces, for example, mice, trackpads, keyboards, etc. In further situations, electronic devices may include a display on which content may be output or shown to a user. The display may be a standalone monitor or screen for a desktop computer in some examples, or may be an integrated screen, for example, in a laptop or notebook computer, or a tablet computer. Other examples may include a display or screen on a different type of electronic device, for example, an imaging device such as a printer, or an additive manufacturing machine such as a three-dimensional (3D) printer. In some situations, the display of an electronic device may be a touch screen display. A user may interact with a touch screen display by touching by hand, or by using an accessory, such as a stylus or electronic pen.

An accessory such as a stylus or electronic pen can be a useful tool in interacting with an electronic device such as a computer having a touch screen display. For example, such an accessory may be used to wrote notes on a display, mimicking a pad of paper or a sticky note, or may further be used to draw or sketch on a display in order to generate electronic drawings or graphic designs.

While useful, such accessories are often stored externally to an electronic device, for example in a user's bag or pocket. Due to the relatively small size of the accessory, this can result in the user inadvertently losing the accessory, or not being able to locate the accessory among other items in the bag. Some electronic devices may include a slot or channel into which the stylus, electronic pen, or other accessory may be inserted in order to be stowed. This solution may take up valuable space or volume within the chassis of the electronic device, where space is often at a premium. In other situations, an additional holding accessory, such as a stick-on or attachable loop, may be able to be attached externally to the electronic device in order to hold the accessory to the electronic device while stowed. Such methods of stowing an accessory may be cumbersome or ugly and not match the industrial design or aesthetics of the electronic device, may not hold the accessory securely enough to the electronic device, and/or may incur additional cost to the user.

In some situations, it may be desirable to employ an accessory holder with an electronic device that may securely hold an accessory, such as a stylus or electronic pen, while stowed, may occupy a minimum amount of internal volume of the chassis of the electronic device, and may have a discrete or favorable appearance, or may match the aesthetic of the electronic device. Implementations of the present disclosure provide accessory holders that are discrete and blend in with the overall aesthetic of an electronic device, and that can securely hold an accessory of the electronic device when stowed.

Figure 1A:
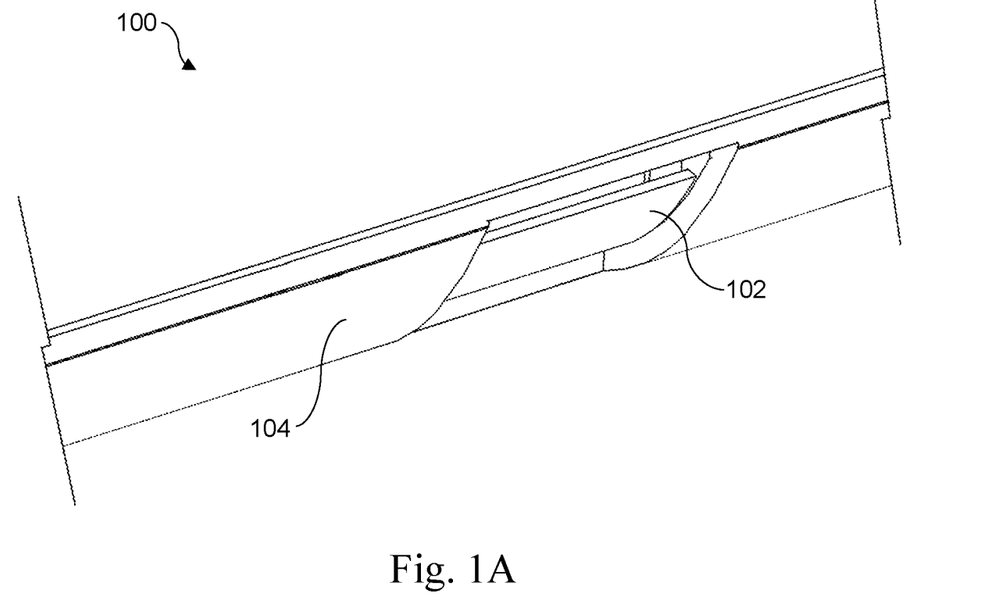
FIG. 1A is a perspective view of an example accessory holder.
Figure 1B:
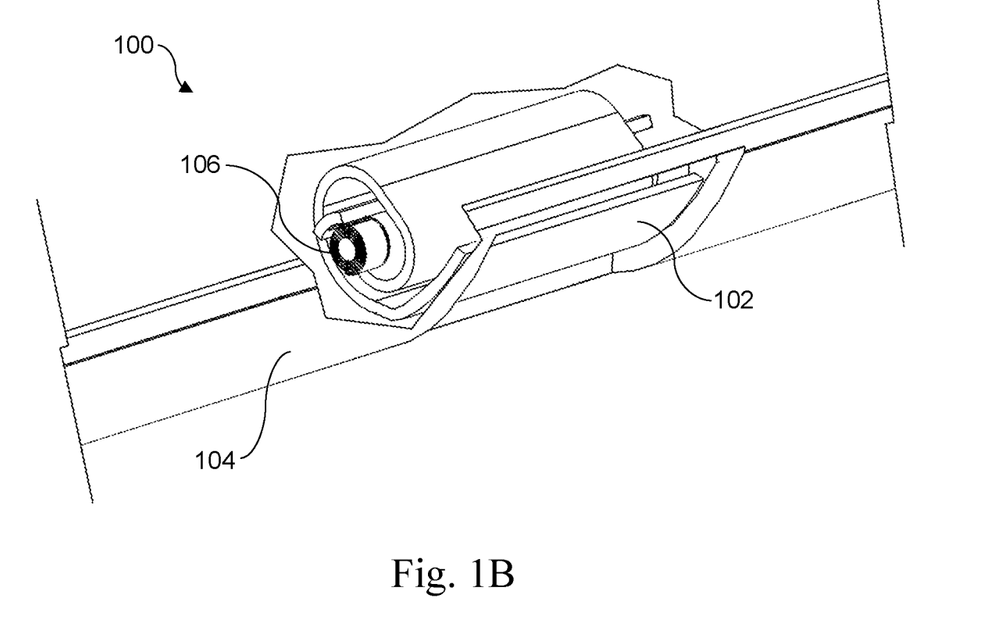
FIG. 1B is perspective cutaway view of the example accessory holder of FIG. 1A.

Referring now to FIGS. 1A-1B, a perspective view and a cutaway perspective view, respectively, of an example accessory holder 100 is illustrated. Accessory holder 100 may include an expandable loop 102 movable between a stowed position within a housing 104 of a device chassis and a deployed position. The expandable loop 102 may be a rollable, coil-able, or otherwise pliable member, able to be formed into or take on multiple shapes. In some implementations, the expandable loop 102 may be a band, strip, panel, or some other type of elongate and thin member, able to be coiled about itself. In some situations, the expandable loop may be constructed of a sheet metal material, a polymer material, a fabric or other soft material, or some other type of pliable or rollable material. When disposed in the stowed position, the expandable loop 102 may be entirely, or at least substantially, located within the housing 104, so as to not extend beyond an external wall of the housing 104. In this context, substantially located within the housing 104 may refer to the expandable loop 102 being located within the housing 104 to such a degree that the overall external aesthetic of the device chassis is not negatively affected, or the expandable loop 102 does not stick out beyond the external wall. In some implementations, the expandable loop 102 may be coiled within the housing 104 when in the stowed position, as illustrated in FIG. 1B.

Figure 1C:
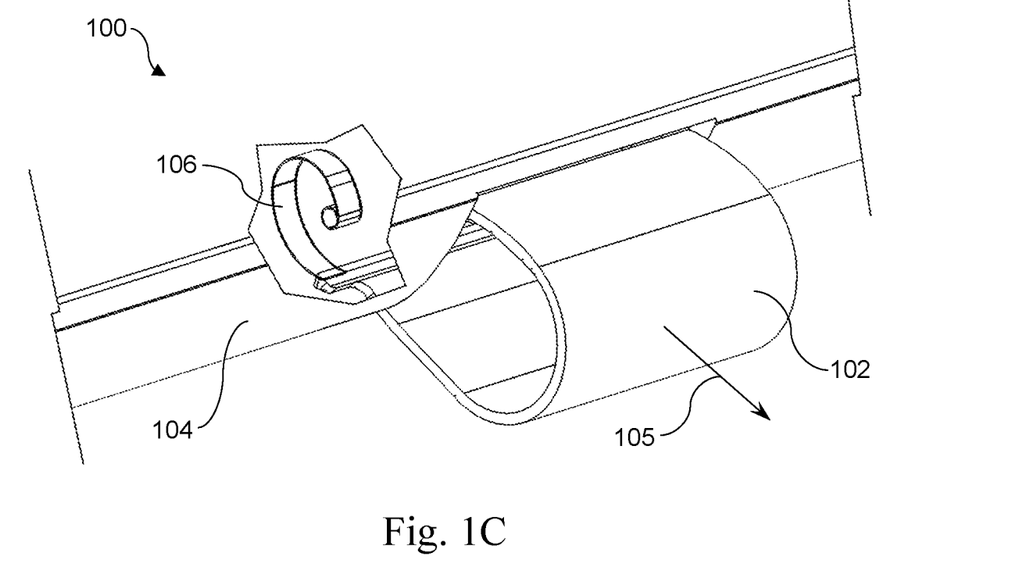
FIG. 1C is perspective cutaway view of the example accessory holder of FIG. 1A while in a deployed position.

Referring additionally to FIG. 1C, a cutaway perspective view of the example accessory holder 100 is illustrated, wherein the expandable loop 102 is disposed in the deployed position. When in the deployed position, the expandable loop 102 may extend out of the housing 104, or beyond the external wall thereof, to receive and hold a device accessory 108, as further illustrated in FIG. 1D, another perspective view of the example accessory holder 100. In some implementations, the expandable loop 102 may be uncoiled from within the housing 104 in order to extend out of the housing, or beyond the exterior wall thereof, in the deployed position. The expandable loop 102 may be pulled along direction 105 by a user to transition the expandable loop 102 from the stowed position to the deployed position.

The example accessory holder 100 may further include a bias member 106 to urge the expandable loop 102 towards the stowed position. The bias member 106 may be a resilient and elastically deformable member so as to be able to return to its original shape after undergoing a deformation. The bias member 106 may apply a reactive force against the direction of deformation. In some implementations, the bias member 106 may be a spring such as a compression or tension coil spring, torsion spring, leaf spring, or another type of spring. In further implementations, the bias member 106 may be a spiral spring, sometimes known as a clock or watch spring.

Figure 1D:
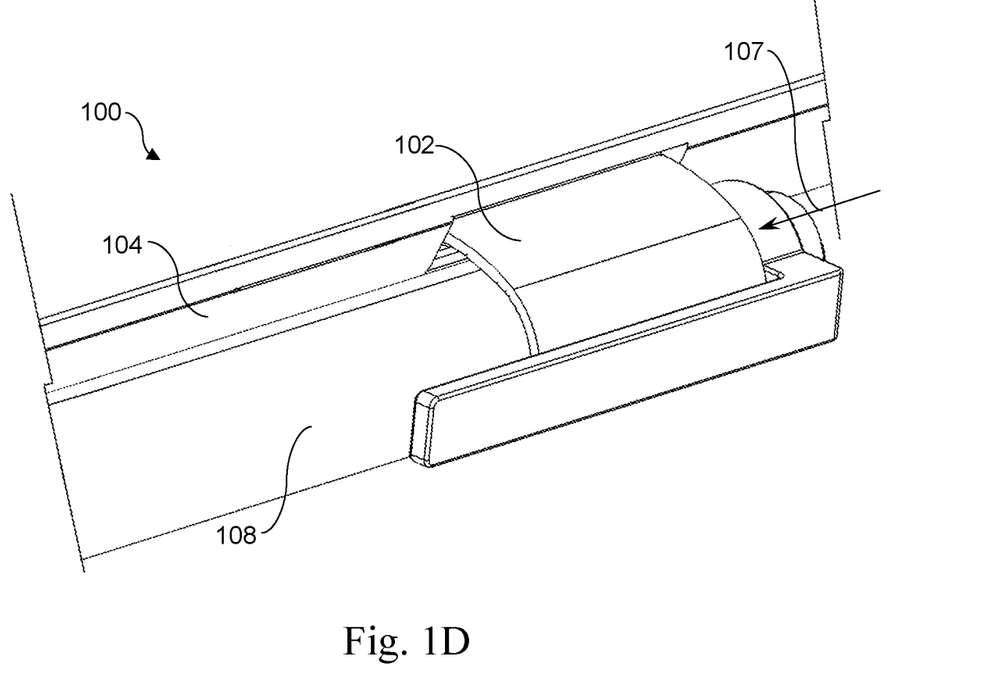
FIG. 1D is perspective cutaway view of the example accessory holder of FIG. 1A holding an accessory of an electronic device while in the deployed position.

Upon a user pulling the expandable loop 102 out of the housing 104 to dispose it in the deployed position, the bias member 106 may resist such pulling through application of a reactive force so as to keep tension on the expandable loop 102. In implementations wherein the bias member 106 is a spiral spring, the expandable loop 102 may unwind the spiral spring upon being disposed in or moved to the deployed position, as illustrated in FIG. 1C. Once the expandable loop 102 is disposed in the deployed position, as shown in FIGS. 1C-1D, a device accessory 108, such as a stylus, electronic pen, or another type of device accessory, may be inserted into a cavity created by the expandable loop 102, for example, along direction 107, in order to stow the device accessory 108 in close proximity to the device chassis. The tension applied to the expandable loop 102 by the bias member 106, in some examples, may cause the expandable loop 102 to tightly secure the device accessory 108 within the accessory holder 100 while it is stowed.

Figure 2A:
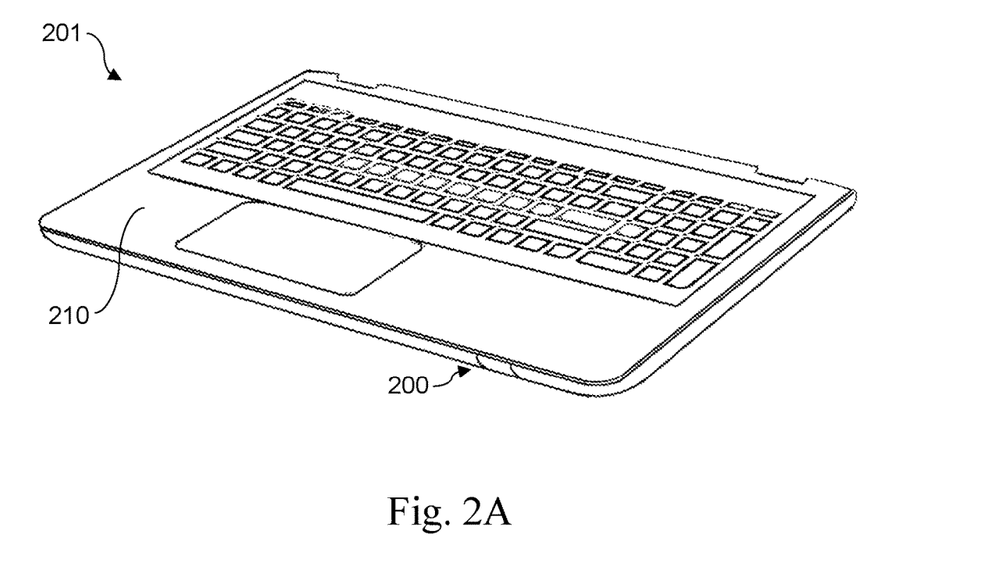
FIG. 2A is a perspective view of a device chassis having another example accessory holder.
Figure 2B:
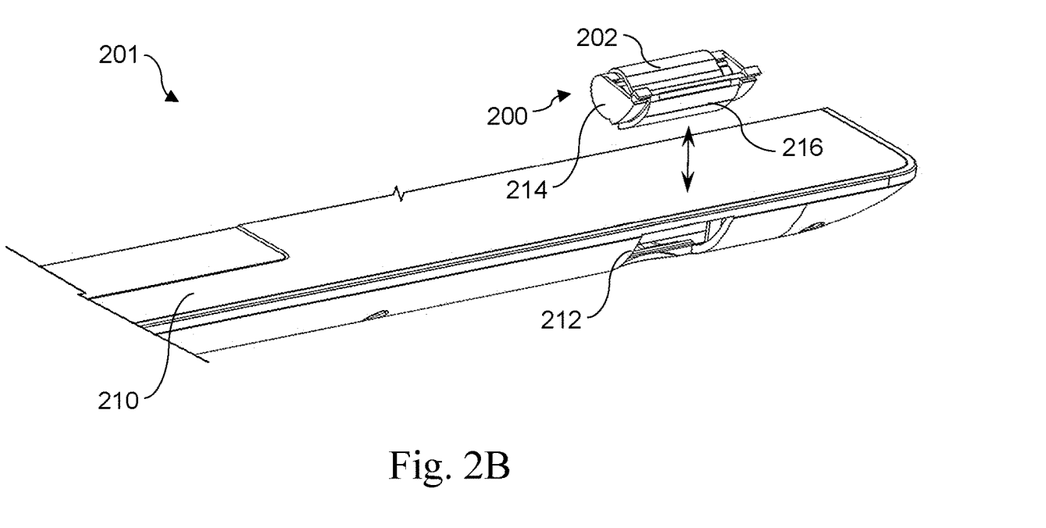
FIG. 2B is a partially exploded view of the device chassis having the example accessory holder of FIG. 2A.

Referring now to FIG. 2A, a perspective view of a device chassis 201 having another example accessory holder 200 is illustrated. The device chassis 201 may include a housing 210 to enclose, at least partially, an electronic device component. The electronic device component may be a processor, storage drive, power supply or battery, motherboard, or another type or suitable component. In some implementations, the housing may also be able to house and/or support a user interface component such as a keyboard, track pad, and the like, as illustrated in FIG. 2A. It should be noted that, while illustrated in such a fashion, the housing 210 may be another type of housing and may have a different appearance and/or structure. Referring now to FIG. 2B, a partially exploded perspective view of the device chassis 201 and the example accessory holder 200 is illustrated wherein the accessory holder 200 is shown as being removed from the housing 210 for clarity. Example accessory holder 200 may be similar to example accessory holder 100, described above. Further, the similarly-named elements of example accessory holder 200 may be similar in function and/or structure to the respective elements of example accessory holder 100, as they are described above.

The housing 210 may include an accessory opening 212 in an external wall of the housing 210. The accessory opening 212 may be a window, channel, aperture, or another type of opening, and may extend entirely through the external wall of the housing 210 into an interior space or volume of the device chassis 201. The example accessory holder 200 may be disposed within the housing 210 near or adjacent the accessory opening 212. Further, the accessory holder 200 may include a loop module 214 disposed within the housing 210 adjacent or near the accessory opening 212. The loop module 214 may be a rigid or semi-rigid member or frame to house or mechanically support, at least partially, other components of the accessory holder 200.

Figure 2C:
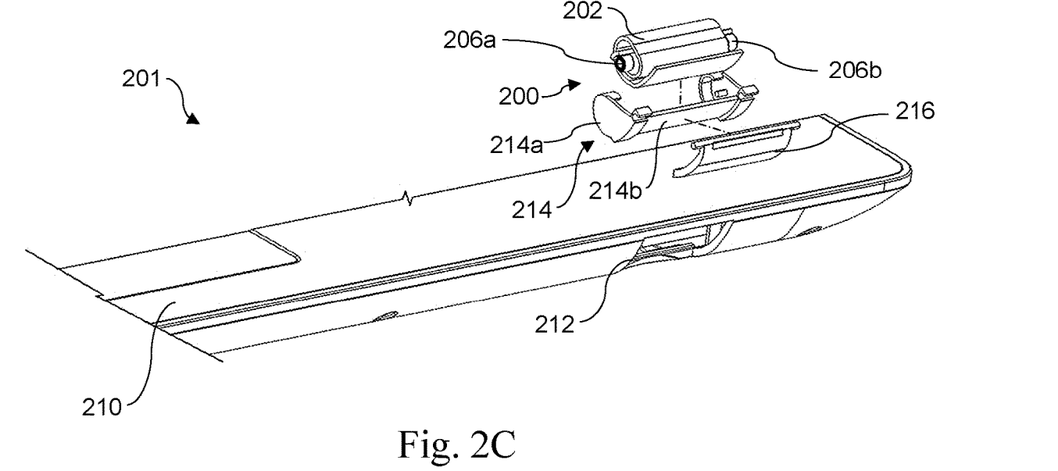
FIG. 2C is an exploded view of the device chassis having the example accessory holder of FIG. 2A.

Referring additionally to FIG. 2C, an exploded perspective view of the device chassis 201 and example accessory holder 200 is illustrated, wherein other components of the accessory holder 200 are shown as exploded from the loop module 214. The accessory holder 200 may include an expandable loop 202 housed within the loop module 214. The loop module 214 may include end plates 214a to sandwich the expandable loop 202. The expandable loop 202 may be movable between a stowed position and a deployed position. When in the stowed position, the expandable loop 202 may be coiled about itself within the loop module 214, in some examples. Further, the loop module 214 may include a barrier 214b, against which an outer end of the expandable loop 202 may rest when the expandable loop is in the stowed position. In the deployed position, the expandable loop 202 may, at least partially, extend out of or beyond the external wall of the housing 210, through the accessory opening 212. Additionally, when the expandable loop 202 is in the deployed position, the barrier 214b may act as a wall within the accessory opening to prevent dust, debris, or other unwanted matter from entering the interior of the housing 210.

In some implementations, the accessory holder 200 may include a bias member, similar to accessory holder 100, described above. In further implementations, the bias member may be a first bias member 206a, and the accessory holder 200 may additionally have a second bias member 206b (referred to collectively as bias members 206). In implementations wherein the bias members 206 are spiral springs, the first bias member 206a may be referred to as a first spiral spring, and second bias member 206b may be referred to as a second spiral spring. First bias member 206a may be disposed on a first side of the expandable loop 202 within the loop module 214, e.g., within one of the end plates 214a, and second bias member 206b may be disposed on a second side of the expandable loop 202 within the loop module 214, e.g., within another one of the end plates 214a. Each of the first and second bias members 206 may resist the movement of the expandable loop 202 from the stowed position to the deployed position, or, in other words, may urge the expandable loop 202 towards the stowed position.

Figure 2D:
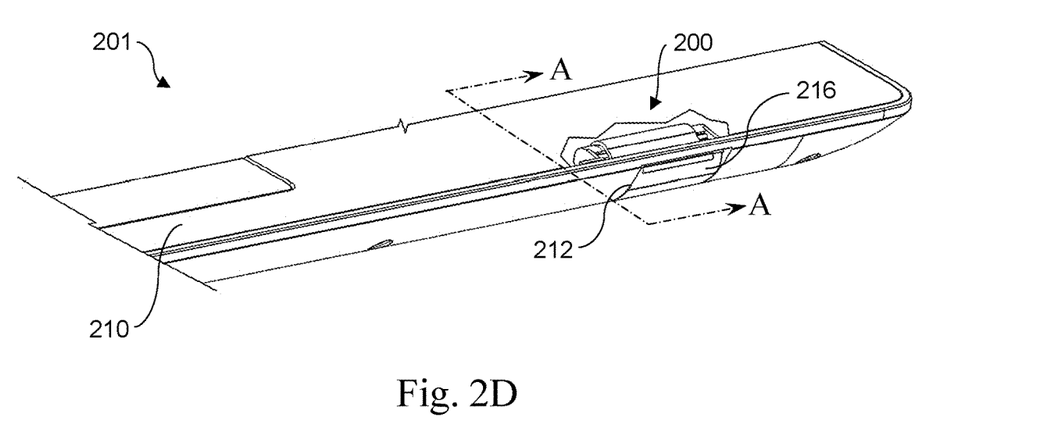
FIG. 2D is a cutaway perspective view of the device chassis having the example accessory holder of FIG. 2A.

The accessory holder 200 may further include a door 216, movable between an open position and a closed position. The door 216 may be a rigid or semi-rigid member having a hinge or other suitable component on one end to enable the door 216 to pivot relative to the housing 210 and the loop module 214. The door 216, in some implementations, may have a similar color, finish, appearance, etc., and may be constructed of similar materials to that of the rest of the housing 210 and/or device chassis 201. The door 216 may be engaged with the external wall adjacent the accessory opening 212. In some implementations, the door 216 may be hingeably attached to the housing 210. In further implementations, the door 216 may be hingeably attached to the loop module 214 adjacent the accessory opening 212. In some implementations, the housing 210 may include an additional cutout or groove adjacent the accessory opening 212 to act as a finger groove or recess so a user may be able to access a non-hinged portion of the door 216 and pull on the door 216 in order to open it. Referring additionally to FIG. 2D, a cutaway perspective view of the device chassis 201 and example accessory holder 200 is illustrated, wherein the expandable loop 202 is in the stowed position, and the door 216 is in the closed position. When in the closed position, the door may cover the accessory opening 212 so as to provide an aesthetically pleasing look, and to prevent contaminants and particles from entering the interior of the housing 210. In some implementations, the door 216 is flush or substantially aligned with the external wall of the housing 210 when in the closed position, to maintain the industrial design of the device chassis 201 and to effectively hide the accessory holder 200. Conversely, when the expandable loop 202 is in the deployed position and the door 216 is in the open position, the accessory opening 212 may be exposed, allowing the expandable loop 202 to extend through the accessory opening 212.

Figure 2E:
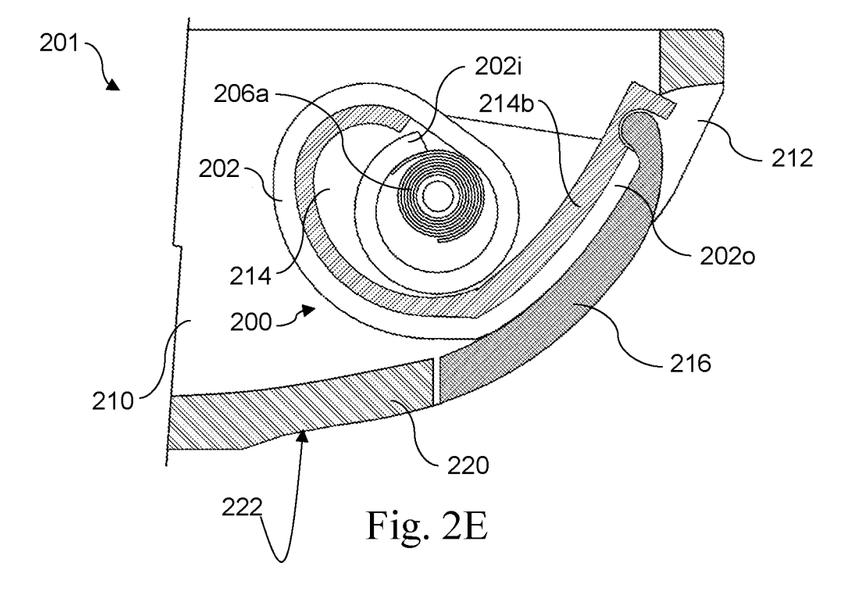
FIG. 2E is a cross-sectional view of the example accessory holder of FIG. 2A while in a stowed position.
Figure 2F:
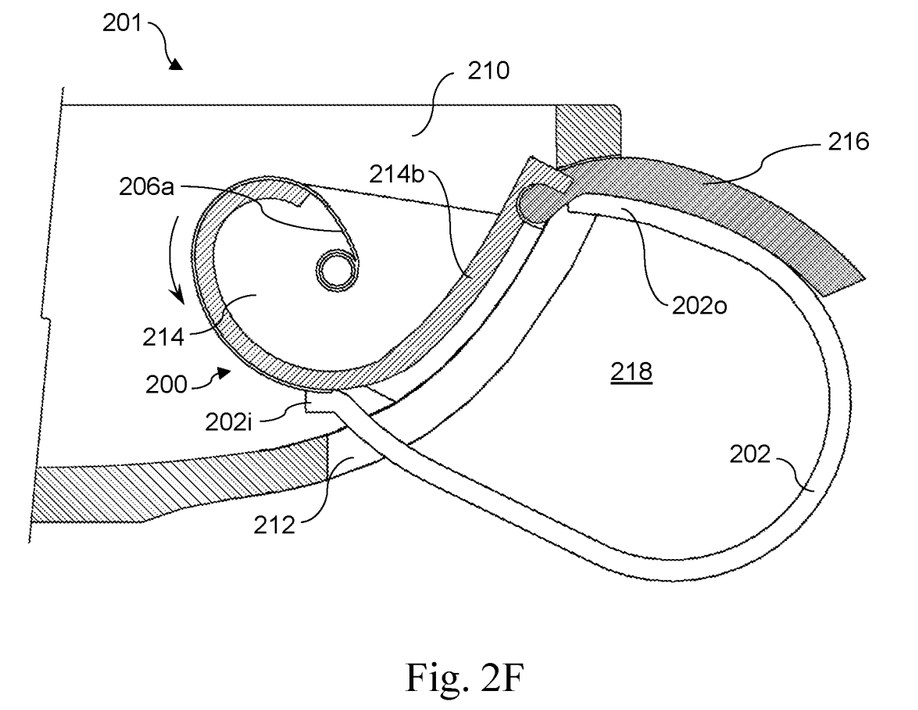
FIG. 2F is a cross-sectional view of the example accessory holder of FIG. 2A while in a deployed position.

Referring now to FIGS. 2E-2F, cross-sectional views of the device housing 201 taken along view line A-A of FIG. 2D are illustrated wherein the expandable loop is in the stowed position and the deployed position, respectively. When the door is in the closed position, it, or an outer surface of it, may be relatively or substantially aligned or flush with an outer surface 222 of the external wall 220 of the housing 210. Substantially aligned or flush, in this context, may refer to the door 216 matching the outer contour, color, shape, etc. of the external wall 220 to such a degree so as to match, maintain, or otherwise not negatively affect the aesthetics of the device chassis 201. Additionally, when the expandable loop 202 is in the stowed position, an outer end 202o of the expandable loop may lay against the barrier 214b of the loop module 214, the barrier 214b providing structural support to the closed door 216.

When in the stowed position, the first bias member 206a (representing both or all of the bias members in FIGS. 2E-2G) may be in an undeformed position, or in a wound or coiled position in implementations wherein the bias members are spiral springs. Further, the bias members 206 may be attached to an inner end 202i of the expandable loop 202 such that, upon the expandable loop 202 being transitioned to the deployed position, the expandable loop 202 may pull on or otherwise actuate and deform the bias members 206, as illustrated in FIG. 2F. FIG. 2F illustrates representative first bias member 206a as being in an unwound, stretched, extended, or otherwise deformed state. As such, the bias members 206 may exert a corresponding reactive force on the expandable loop 202 so as to resist the movement of the expandable loop 202 towards the deployed position. Additionally, the barrier 214b and/or other portions of the loop module 214 may have a curved or otherwise complementary profile to that of the deformed bias members 206 so as to provide structural support to the bias members 206, and effectively give the bias members 206 a surface on which to lay, stretch, and/or travel or be pulled along in such a deformed state, as illustrated in FIG. 2F.

In further implementations, the door 216, or in inner surface thereof, may be attached to or engaged with the outer end 202o of the expandable loop 202 such that, upon the door 216 being opened, the door 216 is to pull the expandable loop 202 from the stowed position to the deployed position. Once in the deployed position, the expandable loop 202 may define an inner cavity or window 218 to receive and hold on to a device accessory.

Figure 2G:
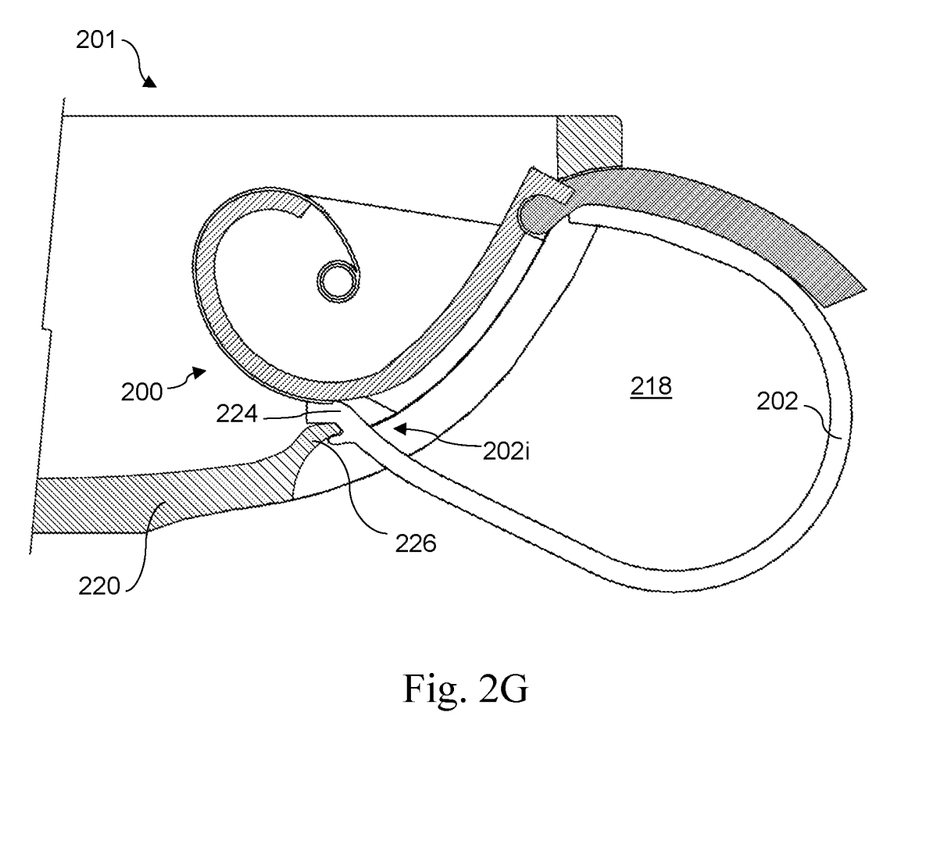
FIG. 2G is a cross-sectional view of another example accessory holder while in a deployed position.

Referring now to FIG. 2G, a cross-sectional view of the device chassis 201 and another example accessory holder 200 is illustrated. In the illustrated implementation, the expandable loop 202 may sometimes include a lock hook 224 disposed at the inner end 202i of the expandable loop 202. Further, the external wall 220 may include a corresponding or complementary lock tab 226 adjacent the accessory opening 212 to engage with the lock hook 224 of the expandable loop 202 when the expandable loop 202 is in the deployed position so as to retain the expandable loop 202 in the deployed position. In other words, upon the door 216 being opened and the expandable loop 202 being pulled to the deployed position to define the inner cavity or window 218, the inner end 202i of the expandable loop 202 may approach and engage with the housing 210 near the accessory opening such that the lock hook 224 latches or hooks on to the lock tab 226, thereby locking the expandable loop 202 in the deployed position. Upon a user desiring to once again stow the expandable loop 202, the expandable loop 202 may be further pulled upon to disengage the lock hook 224 from the lock tab 226, and the bias member or bias members may then pull the expandable loop 202 back within the housing 210 and/or loop module 214 so as to coil the expandable loop 202 about itself and/or the loop module 214 in the stowed position, and the door 216 may be closed.

Figure 3A:
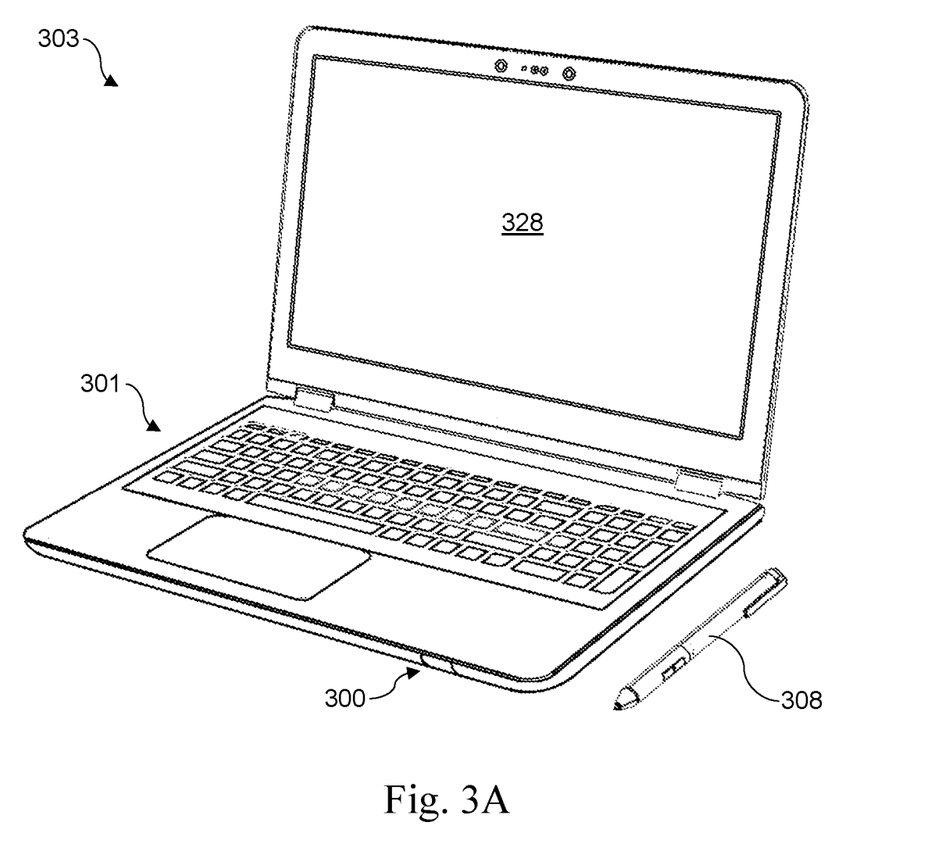
FIG. 3A is a perspective view of an electronic device having another example accessory holder.

Referring now to FIG. 3A, a perspective view of an electronic device 303 having an example accessory holder 300 is illustrated. In some implementations, the electronic device 303 may be a computing device such as a notebook or laptop computer, a desktop computer, an all-in-one (AIO) computing device, or another type of computing device. In other implementations, the electronic device 303 may be a differing type of device, such as an imaging device like a printer or copier, or an additive manufacturing machine or 3D printer.

In some implementations, the electronic device 303 may include a device chassis 301 having a housing to house electronic device components. The electronic device 303 may also include a screen, monitor, user interface panel or display, or another type of display 328 to output content and interfaces to a user. The display 328 may be a touch screen display which may be interacted with using a user's fingers or a device accessory 308. The device accessory 308 may be a stylus, electronic pen, laser pointer, storage device such as a flash drive, or another type of device accessory for which it may be desirable to stow with the electronic device 303. In some implementations, the device accessory may be a simple writing utensil such as a pen or pencil. The electronic device 303 may also include an example accessory holder 300 disposed, at least partially, within the housing of the device chassis 301. Example accessory holder 300, as well as device chassis 301, may be similar to other example accessory holders and device chasses, described above. Further, the similarly-named elements of example accessory holder 300 and device chassis 301 may be similar in function and/or structure to the respective elements of other example accessory holders and device chasses, as they are described above.

The example accessory holder 300 may include a loop module and an expandable loop housed within the loop module and movable between a stowed position, disposed within the loop module, and a deployed position, extending out of the housing. The accessory holder 300 may further include at least one bias member, such as a spiral spring, to urge the expandable loop towards the stowed position, and a door pivotably engaged with the loop module and movable between an open position and a closed position. When the door is in the open position, the expandable loop may extend out of the housing of the device chassis 301 in the deployed position.

Figure 3B:
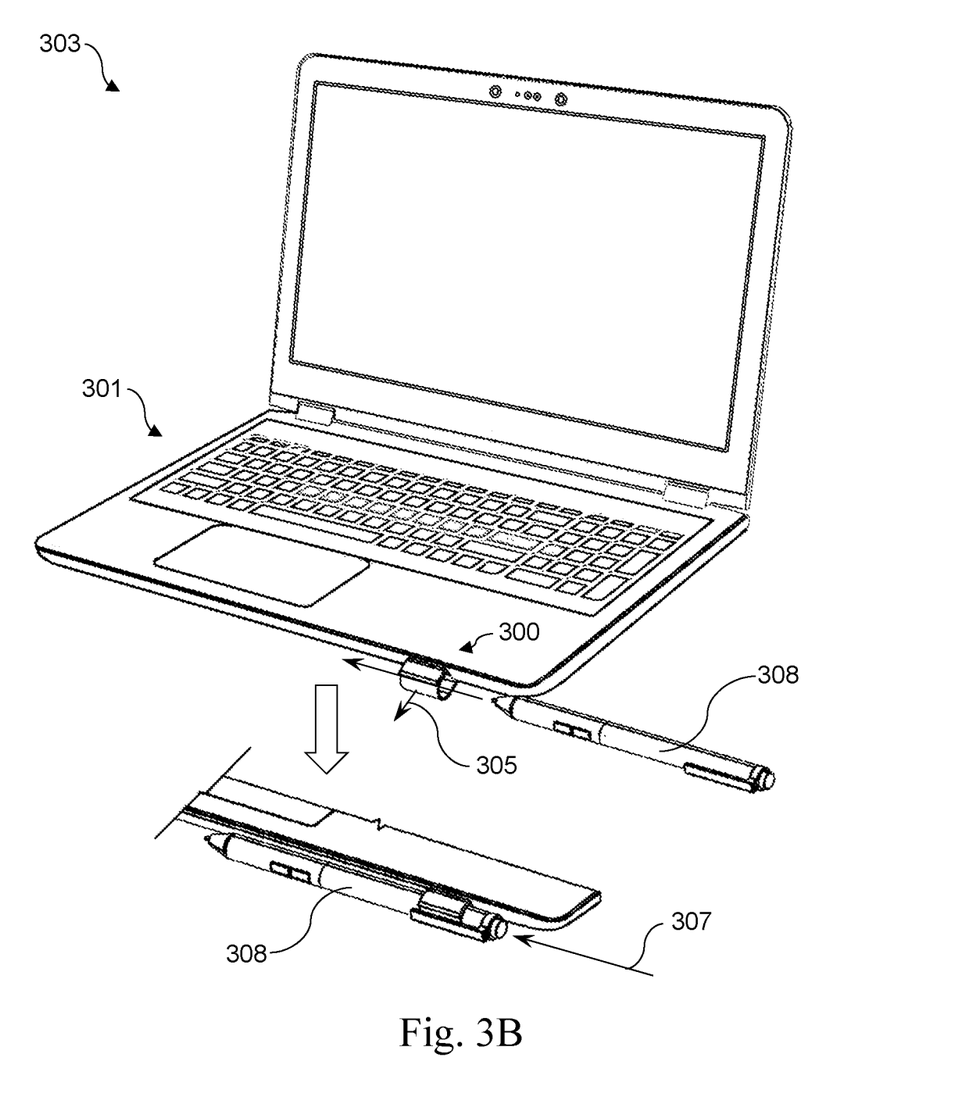
FIG. 3B is a perspective view of the electronic device having the example accessory holder of FIG. 3A while in a deployed position.

Referring now to FIG. 3B, another perspective view of the electronic device 303 is illustrated wherein the device accessory 308 is being stowed within the accessory holder 300. When the device accessory 308 is no longer being used and a user wishes to put the device accessory 308 away or to stow it where it will not get lost, the user may open the door of the accessory holder 300 to the open position, and pull out the expandable loop, either through attachment to the door, or by hand, along example direction 305. Once the expandable loop is in the deployed position, as illustrated in FIG. 3B, the device accessory 308 may be inserted into a cavity defined by the deployed expandable loop, for example along direction 307. Once inserted, the device accessory 308 may be attached to the electronic device 303 in a secure manner and may be accessed by the user when desired. To access the device accessory 308, the user may merely pull the device accessory 308 out of the expandable loop. Upon the device accessory 308 being removed from the expandable loop, the bias member may pull the expandable loop back within the housing of the device chassis 301, wherein the expandable loop may coil about itself in the stowed position, and the door may be closed, thereby hiding the accessory holder and maintaining the aesthetic appearance of the device chassis 301 and the electronic device 303 as a whole.

What is claimed is:

1. An accessory holder, comprising:
   an expandable loop movable between a stowed position within a housing of a device chassis and a deployed position, extending out of the housing to receive and hold a device accessory; and
   a bias member to urge the expandable loop towards the stowed position,
   wherein an outer end of the expandable loop is attached to a door of the device chassis such that, upon the door being opened, the door is to pull the expandable loop from the stowed position to the deployed position.

2. The accessory holder of claim 1, wherein the expandable loop is to be coiled within the housing in the stowed position and is to be uncoiled and is to extend out of an exterior wall of the housing in the deployed position.

3. The accessory holder of claim 1, further comprising a loop module disposed within the housing, the loop module to house the bias member and the expandable loop.

4. The accessory holder of claim 3, wherein the expandable loop is to be coiled within the loop module in the stowed position.

5. The accessory holder of claim 1, wherein the bias member is a spiral spring, the expandable loop to unwind the spiral spring upon being disposed in the deployed position.

6. A device chassis, comprising:
   a housing to enclose an electronic device component, the housing having an accessory opening in an external wall of the housing; and
   an accessory holder, comprising:
     a loop module disposed within the housing adjacent the accessory opening;
     an expandable loop housed within the loop module and movable between a stowed position within the loop module and a deployed position, extending out of the external wall;
     a bias member to urge the expandable loop towards the stowed position; and
     a door engaged with the external wall adjacent the accessory opening and movable between an open position and a closed position, the door attached to an outer end of the expandable loop such that, upon the door being opened, the door is to pull the expandable loop from the stowed position to the deployed position.

7. The device chassis of claim 6, wherein the expandable loop has a lock hook at an inner end of the expandable loop and wherein the external wall of the device chassis includes a lock tab adjacent the accessory opening to engage with the lock hook of the expandable loop when the expandable loop is in the deployed position so as to retain the expandable loop in the deployed position.

8. The device chassis of claim 6, wherein the expandable loop is to receive and hold a device accessory when in the deployed position.

9. The device chassis of claim 6, wherein the door is to be flush with the external wall when in the closed position.

10. An electronic device, comprising:
    a device chassis having a housing to enclose an electronic device component; and
    an accessory holder disposed within the housing adjacent an accessory opening in an external wall of the housing, comprising:
      a loop module;
      an expandable loop housed within the loop module and movable between a stowed position within the loop module and a deployed position, extending out of the accessory opening;
      a spiral spring to urge the expandable loop towards the stowed position; and
      a door pivotably engaged with the loop module and movable between an open position and a closed position, the door attached to an outer end of the expandable loop so as to pull the expandable loop from the stowed position to the deployed position upon being opened.

11. The electronic device of claim 10, wherein the expandable loop is to unwind the spiral spring upon being moved to the deployed position.

12. The electronic device of claim 10, wherein the spiral spring is a first spiral spring disposed on a first side of the expandable loop within the loop module, and the accessory holder further comprises a second spiral spring disposed on a second side of the expandable loop within the loop module, the expandable loop to unwind the first and second spiral springs upon being moved to the deployed position.

13. The electronic device of claim 10, wherein the expandable loop is to receive and hold device accessory when in the deployed position.

* * * * *